US Patent 2,964,450
Patented Dec. 13, 1960

2,964,450
SYNTHESIS OF STEROIDS

Josef Fried, New Brunswick, and Richard W. Thoma, Somerville, N.J., assignors to Olin Mathieson Chemical Corporation, New York, N.Y., a corporation of Virginia No Drawing. Filed Mar. 1, 1957, Ser. No. 643,253

9 Claims. (Cl. 195—51)

This invention relates to and has for its objects the provision of: (1) a microbiological process for preparing 12-oxygenated steroids; and (2) certain new 6,12-oxygenated steroids of the 9(11)-dehydroprogesterone series.

Prior to this invention, there was no known microbiological method for introducing oxygen into the 12-position of a steroid of the pregnane series (e.g., progesterone and hydroxylated progesterones). We have discovered, however, that if a 9(11)-dehydro steroid is employed as a substrate, the allylic 12-position becomes vulnerable to the oxidative attack of certain microorganisms; and thereby a 12-hydroxylated steroid can be formed. The microorganisms which will effect this conversion are those which are known to 11-hydroxylate steroids saturated in the C-ring and unsubstituted in the 11-position (e.g., progesterone). Examples of such organisms include *Colletotrichum phomoides, Thamnidium elegans, Aspergillus nidulans, Tricothecium roseum, Colletotrichum pisi, Coniothyrium helleborine, Cunninghamella blackesleeana, Curvularia lunata, Aspergillus niger, Syncephalastrum racemosum, Neurospora sitophila, Rhizopus nigricans.*

Suitable substrates utilizable in the process of this invention include steroids of the $\Delta^{4,9(11)}$-pregnadiene-3,20-dione series, as exemplified by: 9(11)-dehydroprogesterone [$\Delta^{4,9(11)}$-pregnadiene-3,20-dione]; $\Delta^{4,9(11)}$-pregnadiene-17$\alpha$-ol-3,20-dione; $\Delta^{4,9(11)}$-pregnadiene-21-ol-3,20-dione (and the 21-esters thereof, such as the 21-acetate); $\Delta^{4,9(11)}$-pregnadiene-17$\alpha$,21-diol-3,20-dione (and the 21-esters thereof); $\Delta^{1,4,9(11)}$-pregnatriene-3,20-dione; $\Delta^{1,4,9(11)}$-pregnatriene-17$\alpha$-ol-3,20-dione; $\Delta^{1,4,9(11)}$-pregnatriene-17$\alpha$-21-diol-3,20-dione (and the 21-esters thereof); $\Delta^{1,4,9(11)}$-pregnatriene-21-ol-3,20-dione (and the 21-esters thereof); and $\Delta^{4,9(11),16}$-pregnatriene-3,20-dione; also steroids of the $\Delta^{4,9,(11)}$-androstadiene-3-one series, as exemplified by: $\Delta^{4,9,(11)}$-androstadiene-3,17-dione; $\Delta^{4,9(11)}$-androstadiene-17$\beta$-ol-3-one; and 17$\alpha$-methyl-$\Delta^{4,9(11)}$-androstadiene-17$\beta$-ol-3-one.

The compounds of this invention include 6$\beta$,12$\alpha$-dihydroxy-9(11)-dehydroprogesterone, the diesters thereof and 6,12-diketo-9(11)-dehydroprogesterone; and they may be represented by the general formula:

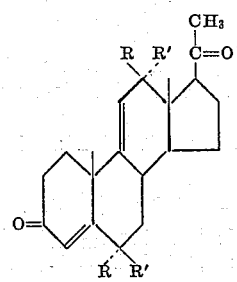

wherein R is hydrogen, R' is hydroxy or acyloxy (particularly the acyloxy radical of a hydrocarbon carboxylic acid having less than ten carbon atoms), or together R and R' is keto.

To prepare the 6$\beta$,12$\alpha$-dihydroxy-9(11)-dehydroprogesterone of this invention, 9(11)-dehydroprogesterone [$\Delta^{4,9(11)}$-pregnadiene-3,20-dione] is subjected to the action of enzymes of one of the microorganisms listed hereinbefore under aerobic conditions. The hydroxylation can best be effected by either including the steroid in an aerobic culture of the microorganism, or by bringing together in an aqueous medium the steroid, air and enzymes of non-proliferating cells of the microorganism.

In general, the conditions of culturing the microorganisms for the purpose of this invention are (except for the inclusion of the steroid to be converted) the same as those of culturing various other aerobic fungi for the production of antibiotics, organic acids or vitamins, i.e., the microorganism is aerobically grown in contact with (in or on) a suitable fermentation medium. A suitable medium essentially comprises a source of nitrogenous factors and a source of carbon and energy. The latter may be a carbohydrate (such as sucrose, molasses, glucose, maltose, starch or dextrin), a higher fatty acid, a fat and/or the steroid itself. Preferably, however, the medium includes an assimilable source of carbon and energy in addition to the steroid. The sources of nitrogenous factors may be organic (e.g., soybean meal, corn steep liquor, meat extract and/or distillers solubles) or synthetic (e.g., composed of simple, synthesizable organic and inorganic compounds, such as ammonium salts, alkali nitrates, amino acids or urea).

An adequate sterile-air supply should be maintained during fermentation, for example, by the conventional methods of exposing a large surface of the medium to air or by utilizing a submerged aerated culture. The steroid may be added to the culture during the incubation period, or included in the medium prior to sterilization or inoculation.

The process yields, inter alia, 6$\beta$,12$\alpha$-dihydroxy-9(11)-dehydroprogesterone, which in turn can be esterified in the usual manner as by treatment with an acyl halide or acid anhydride to yield the diester derivatives. Although any acylating agent may be used, the preferred compounds are the acyl chlorides or acid anhydrides of hydrocarbon carboxylic acids having less than ten carbon atoms, as exemplified by the lower alkanoic acid anhydrides (e.g., acetic anhydride), monocyclic aryl carbonyl chlorides (e.g., benzoyl chloride), monocyclic aralkanoic acid chlorides (e.g., phenacetyl chloride), the lower alkenoic acid anhydrides and the monocycloalkanecarbonyl halides.

6$\beta$,12$\alpha$-dihydroxy-9(11)-dehydroprogesterone is also useful as an intermediate in the preparation of the 6,12-diketo-9(11)-dehydroprogesterone of this invention. This conversion can be effected by oxidation of 6$\beta$,12$\alpha$-dihydroxy-9(11)-dehydroprogesterone with a hexavalent chromium compound (e.g., chromic acid).

6$\beta$,12$\alpha$-dihydroxy-9(11)-dehydroprogesterone and its diesters can also be reduced, as by treatment with zinc in acetic acid, to yield 12$\alpha$-hydroxy-9(11)-dehydroprogesterone or its ester, respectively. As disclosed in the U.S. application of Josef Fried and Josef E. Herz, Serial No. 600,674, filed July 30, 1956, 12$\alpha$-hydroxy-9(11)-dehydroprogesterone and its esters are physiologically active steroids which possess progestational activity.

The compounds of this invention are physiologically active steroids which possess progestational activity. Thus, these new steroids can be administered instead of, and in the same manner as, progesterone in the treatment of habitual abortions. The dosage for such administration is, of course, dependent on the relative activity of the steroid. Thus, where the steroid in question has approximately the same activity as progesterone, the dosage of the former should be approximately equal to the employed dosage of the latter.

The following examples are illustrative of the invention (all temperatures being in centigrade):

EXAMPLE 1

6β,12α-dihydroxy-9(11)-dehydroprogesterone (a) *Fermentation*.—All incubation temperatures are at 25°. Surface growth from a one-week-old agar slant culture of *Colletotrichum phomoides* ATCC 12521 (American Type Culture Collection, Washington, D.C.) [the slant contains soybean meal, 37.5 g.; starch, 20 g.; $CaCO_3$, 2.5 g., and water to make one liter] is washed off with 0.01% aqueous Duponol (wetting agent) solution. The suspension is distributed in equal aliquots among ten 250-ml. conical flasks each containing 50 ml. of the following sterile medium (A):

| | G. |
|---|---|
| Dextrose | 10 |
| Cornsteep liquor | 6 |
| $NH_4H_2PO_4$ | 3 |
| Yeast extract | 2.5 |
| $CaCO_3$ | 2.5 |
| Soybean oil | 2.2 |

Distilled water to one liter.
pH 7.0; sterilized by autoclaving.

After 69 hours of mechanical shaking at 280 r.p.m. in a 2-inch radius, a 10% (vol./vol.) transfer is made to 75 similar flasks containing the same sterile medium (A). After 44 hours incubation of the second flask stage, 925 mg. of 9(11)-dehydroprogesteron in 37.5 ml. methanolic solution is added (25 mg. per flask). After 5 hours further incubation the contents of the flasks are filtered through a Seitz clarifying pad; flasks and pad are washed. The total volume of filtrate and wash is 4150 ml.

(b) *Isolation of 6β,12α-dihydroxy-9(11)-dehydroprogesterone*.—The culture filtrate (4150 ml. is extracted with five 1-liter portions of chloroform and the combined extracts evaporated to dryness in vacuo. The semicrystalline residue (about 1.215 g.) is triturated with acetone and the resulting crystals (about 552 mg.) recrystallized from acetone. Pure 6β,12α-dihydroxy-9(11)-dehydroprogesterone [$\Delta^{4,9(11)}$-pregnadiene-6β,12α-diol-3,20-dione] obtained in this manner has the following properties: M.P. about 231–232°; $[\alpha]_D^{23}+107°$ (c. 0.49 in $CHCl_3$);

$\lambda_{max}^{alc}$ 234 mμ (ε=11,000); $\lambda_{max}^{Nujol}$ 2.96–3.00, 5.92, 6.04, 6.21, 11.44μ

The substance gives a characteristic purple color with concentrated sulfuric acid.

*Analysis*.—Calculated for $C_{21}H_{28}O_4$ (344.44): C, 73.22; H, 8.19. Found: C, 73.40; H, 7.88.

(c) *Isolation of $\Delta^4$-pregnene-9β,11β-oxido-6β,12α-diol-3,20-dione*.—The mother liquors from the above crystallization (two experiments) are combined, dissolved in 5 ml. of chloroform and 45 ml. of benzene and chromatographed on 40 g. of acid-washed aluminum oxide. Elution with 20% chloroform in benzene (1600 ml.) gives amorphous material, which is followed by a crystalline fraction when the eluant is changed to chloroform-benzene 1:1. 1600 ml. of the latter solvent mixture elutes 420 mg. of crude crystals, which after recrystallization from acetone gives a pure product, $\Delta^4$-pregnene-9β,11β-oxido-6β,12α-diol-3,20-dione, of the following properties: M.P. about 202–204°; $[\alpha]_D^{23}+4.6°$ (c. 0.41 in $CHCl_3$);

$\lambda_{max}^{alc}$ 237 mμ (ε=15,000); $\lambda_{max}^{Nujol}$ 2.95, 3.07, 5.95, 6.02, 6.18μ

*Analysis*.—Calculated for $C_{21}H_{28}O_5$ (360.44): C, 69.97; H, 7.83. Found: C, 69.48; H, 7.79.

Continued elution of the column with chloroform (650 ml.) yields an additional amount of 6β,12α-dihydroxy-9(11)-dehydroprogesterone (about 240 mg.). Chloroform containing 5% acetone (300 ml.), 10% acetone (200 ml.) and 25% acetone (100 ml.), respectively, elutes mixed fractions, which are followed by another crystalline band when chloroform-acetone 1:1 (800 ml.) is used as the eluant. The material after crystallization from acetone has the following properties: M.P. about 250–252°; $[\alpha]_D^{23}+23°$ (c. 0.30 in $CHCl_3$);

$\lambda_{max}^{alc}$ 234 mμ (ε=12,000); $\lambda_{max}^{Nujol}$ 2.95, 5.87, 6.05μ

*Analysis*.—Calculated for $C_{21}H_{28}O_4$ (344.44): C, 73.22; H, 8.19. Found: C, 72.77; H, 7.58.

$\Delta^4$-pregnene-9β,11β-oxido-6β,12α-diol-3,20-dione is a new steroid which is useful as a progestational agent. Thus, it can be administered instead of, and in the same manner as, progesterone in the treatment of habitual abortions.

EXAMPLE 2

6β,12α-dihydroxy-9(11)-dehydroprogesterone (a) *Fermentation*.—The fermentation conditions are the same as those used in Example 1, except the culture is three weeks old and is that of *Thamnidium elegans* instead of *C. phomoides*. Five flasks are used in the first stage, 39 in the second; the first flask stage is 66 hours in duration; the second stage lasts 54 hours before and 17 hours after steroid addition; 488 mg. of steroid is used; and the volume of filtrate plus wash is 2140 ml.

(b) *Isolation of 6β,12α-dihydroxy-9(11)-dehydroprogesterone*.—The culture filtrate is extracted with three 700-ml. portions of chloroform, the solvent evaporated in vacuo and the resulting residue recrystallized from 95% alcohol. Pure 6β,12α-dihydroxy-9(11)-dehydroprogesterone results, which has the following properties identical with those reported in Example 1: M.P. about 230–232°;

$\lambda_{max}^{alc}$ 234 mμ (ε=11,000)

*Analysis*.—Calculated for $C_{21}H_{28}O_4$ (344.44): C, 73.22; H, 8.19. Found: C, 73.11; H, 8.32.

EXAMPLE 3

6β,12α-dihydroxy-9(11)-dehydroprogesterone (a) *Fermentation*.—The fermentation conditions are the same as those used in Example 1, except the culture is three weeks old and is that of *Aspergillus nidulans* ATCC 11267. Five flasks are used in the first stage; 39 in the second; the first stage is 48 hours in duration; the second stage lasts 29 hours before and 24 hours after steroid addition; the amount of steroid is 488 mg.; and the volume of filtrate and wash is 2000 ml.

(b) *Isolation of 6β,12α-dihydroxy-9(11)-dehydroprogesterone*.—Pure 6β,12α-dihydroxy-9(11)-dehydroprogesterone is isolated from the culture filtrate by the procedure described in Example 1, section b, and is identical in every respect with the material obtained in Example 1.

EXAMPLE 4

6β,12α-dihydroxy-9(11)-dehydroprogesterone 6β,12α-diacetate 25 mg. of 6β,12α-dihydroxy-9(11)-dehydroprogesterone is dissolved in 0.5 ml. of pyridine and 0.5 ml. of acetic anhydride and the solution allowed to remain at room temperature for 18 hours. Evaporation of the reagents in vacuo leaves the crystalline diacetate, which after recrystallization from acetone-hexane has the following properties: M.P. about 171–172°; $[\alpha]_D^{23}+228°$ (c. 0.43 in $CHCl_3$);

$\lambda_{max}^{alc}$ 232 mμ (ε=14,400); $\lambda_{max}^{Nujol}$ 5.75, 5.86, 5.95. 6.17μ

*Analysis*.—Calculated for $C_{25}H_{32}O_6$ (428.5): C, 70.07; H, 7.53. Found: C, 70.29; H, 7.01.

EXAMPLE 5

6,12-diketo-9(11)-dehydroprogesterone

To a solution of 70 mg. of 6β,12α-dihydroxy-9(11)- dehydroprogesterone in 6 ml. of glacial acetic acid is added a solution of 45 mg. of chromic acid in 9 ml. of glacial acetic acid. After 30 minutes at room temperature 0.5 ml. of alcohol is added, and the mixture is concentrated in vacuo. Water is added and the mixture is extracted with chloroform. The chloroform extract is washed with water and dilute bicarbonate solution, dried over sodium sulfate and evaporated to dryness in vacuo. The light yellow crystalline residue is recrystallized from acetone and gives pure 6,12-diketo-9(11)-dehydroprogesterone of the following properties: M.P. about 208–210°; $[\alpha]_D^{23}+27°$ (c. 0.38 in $CHCl_3$);

$\lambda_{max}^{alc}$ 235–240 m$\mu$ ($\epsilon$=19,300), 313 m$\mu$ (2,300);

$\lambda_{max}^{2.5\%}$ KOH in MeOH 253 m$\mu$ (19,000)

387 m$\mu$ (7,600) (immediately); 258 m$\mu$ (19,600); 432 m$\mu$ (9,900) (after 3 hours);

$\lambda_{max}^{Nujol}$ 5.90, 5.95, 6.25$\mu$

Analysis. Calculated for $C_{21}H_{24}O_4$ (342.42): C, 74.09; H, 7.11. Found: C, 73.77; H, 7.64.

EXAMPLE 6

*12α-hydroxy-9(11)-dehydroprogesterone*

A solution of 52 mg. of 6β,12α-dihydroxy-9(11)-dehydroprogesterone in 3 ml. of glacial acetic acid is refluxed with 104 mg. of zinc dust for 2¼ hours. After removal of the zinc by centrifugation, the acetic acid solution is concentrated in vacuo and the residue taken up in chloroform and water. The chloroform extract is washed with dilute sodium bicarbonate solution, dried over sodium sulfate and evaporated to dryness in vacuo. The amorphous residue is dissolved in 1.5 ml. of benzene and 2 ml. of hexane and chromatographed on 1 gram of acid-washed alumina. Elution with benzene-hexane 1:1 and with benzene furnishes amorphous material, which is followed by a crystalline fraction (benzene-chloroform 1:1). Recrystallization from the acetone-hexane furnishes pure 12α-hydroxy-9(11)-dehydroprogesterone of the following properties: M.P. about 166–168°; $[\alpha]_D^{23}+198°$ (c. 0.27 in $CHCl_3$);

$\lambda_{max}^{alc}$ 238 m$\mu$ ($\epsilon$=16,000); $\lambda_{max}^{Nujol}$ 2.96, 5.90, 6.00, 6.20, 11.59$\mu$ In a similar manner, 6β,12α-dihydroxy-9(11)-dehydroprogesterone 6β,12α-diacetate can be reduced to 12α-hydroxy-9(11)-dehydroprogesterone 12α-acetate.

EXAMPLE 7

*Δ⁹⁽¹¹⁾-allopregnene-3,6,12,20-tetraone*

A solution of 25 mg. of 6,12-diketo-9(11)-dehydroprogesterone in 2 ml. of glacial acetic acid and 1 ml. of water is heated on the steam bath with 120 mg. of zinc dust for 15 minutes. During this period of heating, the yellow color of the solution is completely discharged. The residual zinc is removed by centrifugation and washed with acetic acid. The combined acetic acid solutions are concentrated in vacuo and the residue taken up in water and chloroform. The chloroform extract is washed with water and dilute sodium bicarbonate, dried and evaporated to dryness in vacuo. The crystalline residue, upon recrystallization from acetone-hexane, gives pure $\Delta^{9(11)}$-allopregnene-3,6,12,20-tetraone of the following properties: M.P. about 242–244°; $[\alpha]_D^{23}$ —2° (c. 0.33 in $CHCl_3$);

$\lambda_{max}^{alc}$ 234 m$\mu$ ($\epsilon$=12,000);

$\lambda_{max}^{2.5\%}$ KOH in MeOH 259 m$\mu$ ($\epsilon$=13,100);

431 m$\mu$ (6,700) (after 4 hours);

$\lambda_{max}^{Nujol}$ 5.81, 5.86, 5.98, 6.23$\mu$

The invention may be otherwise variously embodied within the scope of the appended claims.

We claim:

1. A process for preparing a 12-hydroxy steroid which comprises subjecting a 9(11)-dehydro steroid unsubstituted in 12 position to the action of enzymes of a microorganism which will effect an 11-hydroxylation of a steroid saturated in the C-ring and unsubstituted in the 11-position under aerobic conditions and recovering the 12-hydroxy 9(11)-dehydro steroid formed.

2. The process of claim 1, wherein the steroid reactant is a 9(11)-dehydro-3,20-diketo steroid of the pregnene series.

3. A process for preparing 6β,12α-dihydroxy-9(11)-dehydroprogesterone which comprises subjecting 9(11)-dehydroprogesterone to the action of enzymes of a microorganism which will effect an 11-hydroxylation of a steroid saturated in the C-ring and unsubstituted in the 11-position under aerobic conditions said microorganism being selected from the group consisting of *Colletotrichum phomoides, Thamnidium elegans, Aspergillus nidulans, Tricothecium roseum, Colletotrichum pisi, Coniothyrium helleborine, Cunninghamella blakesleeana, Curvularia lunata, Aspergillus niger, Syncephalastrum racemosum, Neurospora sitophila* and *Rhizopus nigricans* and recovering the 6β,12α-dihydroxy-9(11)-dehydroprogesterone formed.

4. The process of claim 3, wherein the microorganism is *Colletotrichum phomoides*.

5. The process of claim 3, wherein the microorganism is *Thamnidium elegans*.

6. The process of claim 3, wherein the microorganism is *Aspergillus nidulans*.

7. A process for preparing an ester of a 12-hydroxy-steroid which comprises subjecting a 9(11)-dehydro steroid unsubstituted in the 12-position to the action of enzymes of a microorganism which will effect an 11-hydroxylation of the steroid saturated in the C-ring and unsubstituted in the 11-position under aerobic conditions, and treating the 12-hydroxy-9(11)-dehydro steroid thus formed with a member selected from the group consisting of acyl halide and acid anhydride.

8. A process for preparing a 12-keto-steroid which comprises subjecting a 9(11)-dehydro steroid unsubstituted in the 12-position to the action of enzymes of a microorganism which will effect an 11-hydroxylation of a steroid saturated in the C-ring and unsubstituted in the 11-position under aerobic conditions and oxidizing the 12-hydroxy-9(11)-dehydro steroid thus formed to yield the 12-keto final product.

9. A process in accordance with claim 3 comprising the step of dehydroxylating the 6β,12α-dihydroxy-9(11)-dehydroprogesterone to yield 12α-dihydroxy-9(11)-dehydroprogesterone.

References Cited in the file of this patent

UNITED STATES PATENTS

| | | |
|---|---|---|
| 2,360,447 | Schmidt et al. | Oct. 17, 1944 |
| 2,408,828 | Wagner | Oct. 8, 1946 |
| 2,649,401 | Haines et al. | Aug. 18, 1953 |
| 2,649,402 | Murray | Aug. 18, 1953 |
| 2,681,919 | Levin | June 22, 1954 |
| 2,735,800 | Murray et al. | Feb. 21, 1956 |
| 2,756,179 | Fried et al. | July 24, 1956 |

OTHER REFERENCES

Hoehn et al.: Jour. Biochem., vol. 152, 1944, pages 59–66.